A. D. BISHOP.
BALL CARRIAGE.
No. 42,066. Patented Mar. 29, 1864.
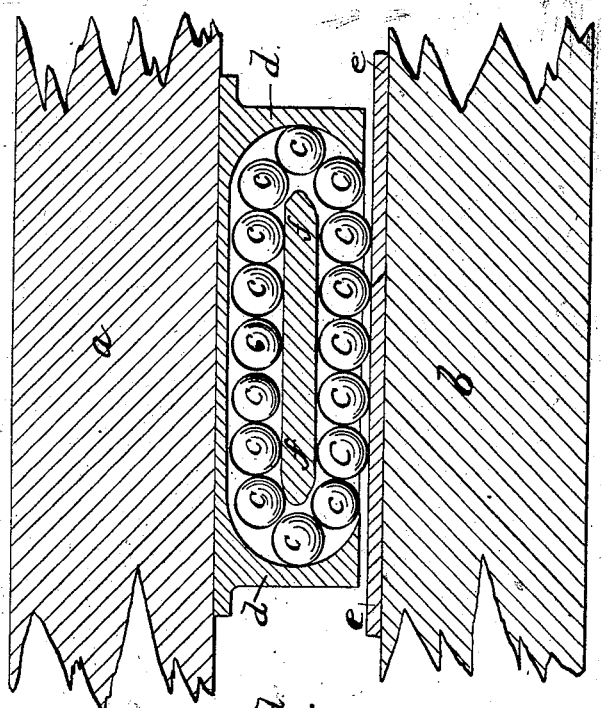
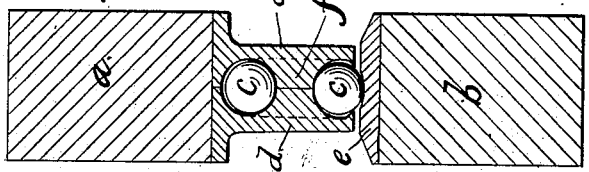
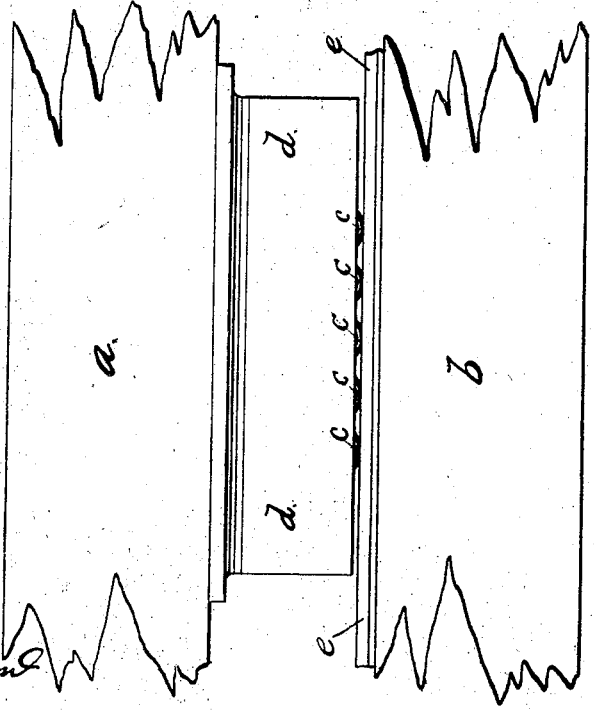
Witnesses
Inventor

UNITED STATES PATENT OFFICE.

ALBERT D. BISHOP, OF NEW YORK, N. Y.

IMPROVEMENT IN BALL-CARRIAGES.

Specification forming part of Letters Patent No. 42,066, dated March 29, 1864; antedated February 17, 1864.

*To all whom it may concern:*

Be it known that I, ALBERT D. BISHOP, of New York, in the county and State of New York, have invented a new and useful Improvement in Ball-Carriages; and I do hereby declare that the following is a full, clear, and exact description of the same, reference being had to the accompanying drawings, making a part of this specification, and to the letters of reference marked thereon.

Where it has been necessary to transpose exceedingly heavy weights cannon balls have been applied between the moving and stationary parts for the purpose of lessening or obviating the friction; but as the moving body advances twice as fast as the balls, the former soon overruns the latter, and renders it necessary either to keep a continuous row of balls extending over the entire space to be overcome, or else to shift the balls over which the moving body has once passed again ahead, to be rolled over again and again, as the distance may require. If axles were placed upon the balls to carry them forward with the load, it also converted them into wheels, with the very great objections to which wheels are liable of no longer progressing with a simple rolling motion, occasioned by the adhesion of the upper part to the moving body and that of the lower part to the stationary ways or track laid upon the ground, but it would be a sliding motion of the entire weight on the journals with a degree of friction dependent upon and proportioned to their relative size; and when the diameter of the journals or axles is reduced to a minimum, the risk is incurred, by carrying the weight on such a contracted space, of splitting the wheels or the bearings by which they are carried, and involving the entire work in the inconvenience of a general breakage.

The object of my invention is to use balls or spheres for the transposition of heavy weights without at the same time being compelled to extend the balls over the space to be traversed or to shift them forward, as before explained. To accomplish this object I use the balls, in connection with a carriage in which they are contained, in such a manner that after they have passed over a space dependent upon the length of the t   riage they are lifted in rotation from the ways or track and forced forward within the carriage by the pressure of the other balls upon which the weight is at the same time advancing.

To enable others skilled in the arts to which it appertains to make and use my invention, I will proceed to describe its construction and operation with reference to the drawings.

Figure 1 is an outside view of one of the said ball-carriages attached to a cradle and resting upon a sleeper upon which it traverses. Fig. 2 is a transverse section, and Fig. 3 is a longitudinal section of the same.

The timber or sill of the cradle is represented at $a$ and the sleeper upon which it rests is shown at $b$. The balls $c$ are carried by the carriage $d$, within which they travel in an oval groove in such a manner that while they support the weight they travel as if they were simply interposed between the moving weight and the stationary rail $e$, which is grooved for their reception, but as soon as they are relieved from the weight by the passage of the carriage or the central part, $f$, of which rests upon them, they are forced up the groove at the back end of the carriage and forward along the upper part of the groove, where they carry only their own weight, until they reach the forward end of the carriage and descend to the rail to again roll under the carriage and sustain the weight.

I have described the balls returning within the carriage in a groove which traverses directly over the rail; but it is obvious that the groove may be extended around one side of the carriage instead of the top, where it is desirable that the carriage should occupy as little height as possible.

The carriage may be made in halves to inclose the balls or in any other way that may be convenient to receive them.

The balls should be cast in chills. And I would here remark that I do not wish to confine myself to any particular construction of carriage, but that the principle and character of my invention may be applied sidewise and upward as well as downward, with any modifications of shape that may be desirable. In a similar manner the rolling motion of the balls which I have described may be obtained, without departing from the principle of my invention by the use of plain or grooved rollers, which work without axles through the groove or passage within and under the carriage.

I claim as my invention—

A carriage in which the balls or rollers for sustaining a traversing weight may be shifted, in the manner and for the purpose described.

A. D. BISHOP.

Witnesses:
I. BUNHAM,
WM. KEMBLE HALL.